Nov. 12, 1963  FRIEDRICH-WILHELM SCHOLKEMEIER ETAL  3,110,237
FILM GUIDE FOR ROLL FILM CAMERAS
Filed March 9, 1960                                    2 Sheets-Sheet 1

3,110,237
FILM GUIDE FOR ROLL FILM CAMERAS
Friedrich-Wilhelm Scholkemeier, Friedrich Sommermeyer, and Waldemar Gärtner, all of Braunschweig, Germany, assignors to Franke & Heidecke, Fabrik Photographischer Präzisions-Apparate, Braunschweig, Germany, a firm of Germany
Filed Mar. 9, 1960, Ser. No. 13,905
Claims priority, application Germany Mar. 12, 1959
3 Claims. (Cl. 95—31)

The present invention relates to a film guide for roll film cameras and, more particularly, to an adjustable film guide channel formed between a glass plate associated with a focal plane image aperture frame and a resilient pressure plate carried by the rear wall of the camera.

The roll film camera herein described is preferably but not necessarily a twin lens reflex type of camera having a lower exposure chamber at the rear of which is disposed an image aperture frame behind which the film moves to be exposed frame by frame. The film moves off of a supply spool at one side of (usually below) the exposure chamber and past the image aperture frame in the focal plane of the camera to be received on a wind-on spool, and during this movement there is a tendency for the film to bulge rearwardly out of the focal plane behind the image aperture frame. For this reason, to prevent the film from bulging and to keep it approximately flat while in the focal plane position, the film passes through a guide channel formed at the front by, in this case, a glass plate secured in the image aperture frame, and at the rear by a pressure plate suspended from the rear wall of the camera. The thickness of the guide channel (sometimes referred to as the width thereof) is preferably slightly greater than the thickness of the film and backing paper, since the formation of Newton rings would be assisted if the film were pressed directly onto the glass plate. However, this thickness of channel in conjunction with a glass plate, although adequate for smooth motion of the film after it is in position for the first exposure, is not sufficient in order to prevent binding or soiling or scratching of the glass plate by the adhesive tape or layer with which the leading end of the sensitized film is secured to the backing paper and which produces a considerable thickening of the roll film at this point.

Accordingly, an object of the invention is to provide a new and improved adjustable mechanism for providing an adjustable guide channel for film at the focal plane of the camera behind the image aperture frame for maintaining the film in parallel relation with the focal plane of the exposure lens in its passage from the supply spool to the exposed or winding-on spool.

Another object is the provision of an adjustable film guide mechanism which freely passes the thickened portion of the film caused by the joint of adhesive tape or the like with which the leading end of the film itself is secured to the backing paper, and which narrows down for the remaining portion of the film consisting only of the backing paper and attached film, to maintain the film substantially parallel to the focal plane of the camera and relatively snug in its channel.

Still another object of the invention is to provide for an initial automatic lifting of the film pressure plate relative to the glass plate by an amount such that the guide channel is wider (thicker) than the total thickness of the film, backing paper and adhesive layer, and that after the adhesive layer has passed through, the normal guide channel width is automatically resumed upon reaching the first image frame, and that the initial position providing a thick channel is automatically prepared again on opening the camera after exposure of the film.

A further object is to provide a new and improved adjustable film channel mechanism which is actuated in response to turning of the winding crank for moving the film from the supply spool to the winding-on pool.

A still further object is to provide a film channel between a glass plate and a rear pressure plate which has a normal width which can be adjusted, and which may initially be widened or thickened to pass the thickened portion of the film without binding or soiling of the glass plate.

These and other desirable objects may be attained in the manner disclosed as an illustrative embodiment of the invention in the following description and in the accompanying drawings forming a part hereof, in which.

The same reference numerals throughout the several views indicate the same parts.

Figures 1, 2:
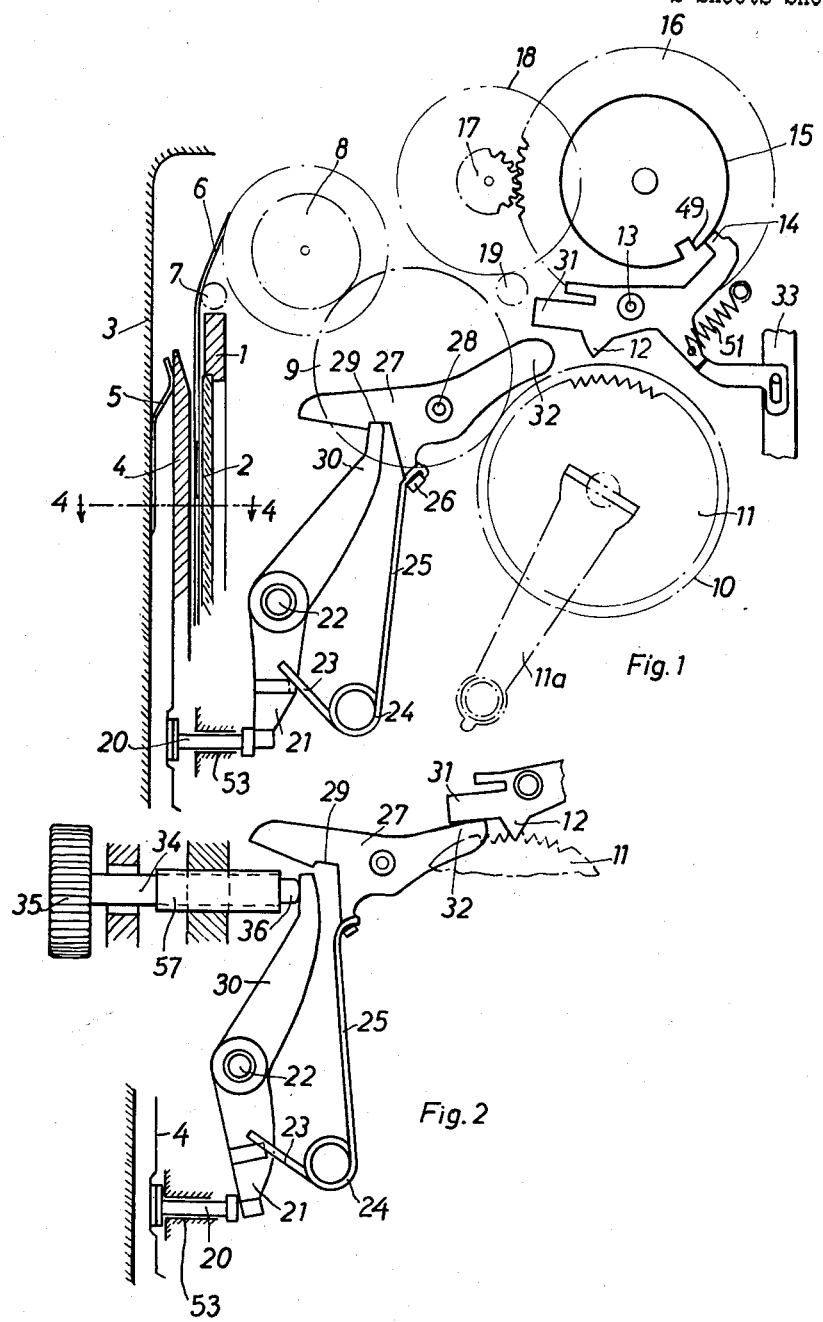
FIG. 1 is a diagrammatic side elevational view, partly in cross section, of a portion of a camera constructed in accordance with the invention.
FIG. 2 shows a portion of the structure of FIG. 1 in a released position, together with an adjusting means optionally employed.

While the present invention may be applied to various forms of cameras, it is here disclosed by way of example as applied to a twin lens reflex camera of the kind identified by the trademark "Rolleiflex," manufactured by the firm of Franks & Heidecke, of Braunschweig, Germany, and widely known and used throughout the United States. The following disclosure of the invention presupposes familiarity with the main constructional features of the "Rolleiflex" camera. For those not already familiar with the construction of this camera, reference may be made to the handbook "Rollei Photography, Handbook of the Rolleiflex and Rolleicord Cameras," by Jacob Deuschin, published in 1952 by Camera Craft Publishing Company, of San Francisco, California. As will be readily understood by those familiar with the "Rolleiflex" camera, this camera comprises two lenses, a lower or picture taking lens with which a shutter is associated, and an upper or finder lens with no shutter. Rays passing through the finder lens are reflected by a mirror to a focusing screen, of ground glass or the like, at the top of the camera. In FIG. 1 is shown an image aperture frame 1 having a rectangular opening in which is supported a transparent glass plate 2. It will be understood that the image aperture frame 1 is at the rear of the camera, approximately parallel to the rear wall 3, and is located behind the lower picture taking lens. The glass plate 2, it will be noted, is supported in the frame 1 with its back surface rearwardly of the rear surfaces of the rail members providing the frame 1. As is more fully explained in Patent 2,739,515, to R. Heidecke, granted March 27, 1956, when the rays of light pass through the transparent plate in traveling from the picture taking lens to the film 6 behind the glass plate 2, the effect of the glass plate 2 is to lengthen the lens-to-image distance by an amount equal to approximately one-third of the thickness of the glass plate 2. The rear face of the glass plate 2 is accordingly positioned rearwardly from the normal focal plane, defined by the face of the image aperture frame 1, by this same distance by which the image is displaced. In this manner, the effective optical distance from the upper finder lens to the focusing screen at the top of the camera is kept substantially the same as the effective optical distance from the lower picture taking lens to the film 6, regardless of whether the glass plate is employed or removed, so that the presence or absence of the glass plate does not affect the accuracy of focusing.

The film 6 passes off of a supply spool not here shown but located below the lower rail of the frame 1 and forwardly thereof, thence passes behind the glass plate 2 and frame 1, and upwardly over a guide roller 7 to be wound upon a take-up spool 8. There is a tendency for the film 6 to bulge out rearwardly as it passes behind the glass plate 2. For this reason, a pressure plate 4 is suspended from the hinged back wall 3 of the camera housing and is urged forwardly by the springs 5 when the back 3 is closed. The pressure plate 4 in operative position is substantially parallel to the glass plate 2 and is spaced rearwardly thereof by a small distance to provide a film guide channel through which the film 6 travels. The width (or thickness, if one prefers to call it that) of the guide channel is normally slightly greater than the thickness of the film 6 (film itself plus backing paper), to reduce the possibility of formation of Newton rings which might be formed if the film were pressed tightly directly onto the glass plate, and also to reduce the possibility of damaging the emulsion of the film if it were dragged across the glass plate in tight contact therewith.

As the film 6 passes through the film guide channel, the film is maintained substantially parallel to the focal plane of the picture taking lens of the camera, any tendency to bulge rearwardly being prevented by the rear pressure plate 4. However, the film 6 is not of uniform thickness. As usual in so-called "roll film," the leading end of the sensitized film is secured to the backing paper by a piece of adhesive tape or other suitable adhesive means which produces a considerable thickening of the film assembly at this point. The width of the normal film guide channel is chosen to pass freely the normal thickness of the film (sensitized strip plus paper backing) but is not sufficiently wide to prevent binding or soiling or scratching of the glass plate by the thickened part of the roll film caused by the adhesive connection above mentioned. According to the invention, the rear pressure plate 4 is retracted initially to allow passage of the thicker part of the film, and is narrowed down to normal size by the time the first frame of the film is in exposure position. Furthermore, the mechanism for initially retracting the pressure plate 4 is coupled for actuation with the film winding crank of the camera.

There is mounted coaxially with the winding-on spool 8 a gear which is in meshing engagement with another gear 9. The gear 9, in turn, engages a gear 10 fixed for rotation with the shaft of a winding crank 11a. The winding crank 11a projects from the side wall of the camera, and it may be seen that rotation of the crank 11a in a clockwise direction is transmitted through the gears 11 and 9 to rotate the winding-on spool 8 to wind on the film 6. The film winding mechanism may be of the conventional kind customarily found in a "Rolleiflex" camera, or as shown, for example, in Muller Patent 2,148,636, granted February 28, 1939. FIG. 1 of this patent also shows, at 12a, the thickened joint where the front end of the film strip is attached to the backing paper.

The winding crank 11a is coupled with the usual counter and metering mechanism for limiting the rotation of the crank 11a from one frame position of the film to the next. For this purpose, a ratchet 11 is secured for rotation with the shaft of the crank 11a and cooperates with a locking pawl 12 rotatable about a pin 13. Another projection 14 on the pawl 12 rides on the periphery of a notched disk 15 forming a component of a suitable counter mechanism. Although only one notch 49 is shown in the disk 15, it will be understood that there are as many peripheral notches as there are frames of film. The notched disk is driven through a toothed gearing 16, 17, 18 from a shaft 19, which rests with a metering sprocket on the film or on the convolutions of the film spool 8. This gearing is of such dimensions that with the advance of the film 6 by the height of the image aperture, the notched disk 15 is advanced by one notch in a circumferential direction, and at the end of this movement, the projection 14 of the locking pawl 12 drops into the notch 49 in the disk 15, under the action of a spring 51. At the same time, the locking pawl 12 drops into the ratchet 11, whereby further rotation of the crank 11a is prevented. For a fuller and more complete explanation, see, for example, the above mentioned Muller patent, and also Weiss Patent 2,868,099, issued January 13, 1959. The locking pawl 12 is also coupled to a shutter release linkage 33. Upon actuating the shutter release of the camera, the linkage 33 is actuated to lift the pawl 12 from the ratchet 11, and the projection 14 from the notched disk 15, so that another winding action may be started.

Substantially midway of its height, one lateral edge of the film pressure plate 4 carried by the removable back wall 3 bears against a support 20 in the form of a pin which is slidably mounted in a bore 53 in the camera body and has an enlarged head at either end to prevent its removal from this bore. The lower arm 21 of the double-armed lever rotatable about a fixed pin 22 bears against the inner end of the pin 20. One end 23 of a hairpin spring 24 engages the lever arm 21 to urge the pin 20 constantly outwardly toward the film pressure plate 4. The other arm 25 of the hairpin spring 24 engages on a lug 26 of another double-armed lever 27, pivoted about the fixed pin 28. The outer arm of the lever 27 is provided with a downwardly opening recess 29 which forms the latch for the upper arm 30 of the double-armed lever pivoted on the pin 22.

In the position illustrated in FIG. 1, the lever arm 30 is positively engaged in the recess 29 in the locking lever 27, so that the other lever arm 21 is moved in a clockwise direction to urge the pin 20 outwardly to an operative positive lying in the path of the rear pressure plate 4. Thus, when the removable back 3 is closed, the pressure plate 4 is prevented by this abutment with the pin 20 from moving through its full range of forward movement toward the image aperture frame 1 and the glass plate 2 under the action of the springs 5. The film channel formed between the pressure plate 4 and glass plate 2 is consequently wider or thicker than normal, of sufficient width to pass freely the part of the film 6 which is thickened by the presence of the above mentioned adhesive layer.

Upon winding the film by turning the crank 11a, the latching of the lever arm 30 by the double-armed locking lever 27 remains unchanged until the film wind locking pawl 12 engages in the ratchet 11. The pawl 12 has a rearwardly extending arm 31 which at this point presses on the inner arm 32 of the locking lever 27, thereby rocking the lever 27 in a clockwise direction (FIG. 2). By this motion the recess 29 is lifted from the lever arm 30, so that now the film pressure plate springs 5 may urge the film pressure plate 4 against the aperture frame 1, or against suitable abutments which may be provided for holding the pressure plate at the desired normal distance rearwardly from the glass plate, such for example as the abutments shown at 16 in Heidecke Patent 2,645,170, granted July 14, 1953. The forward force exerted by the springs 5 is stronger than the rearward force of the arm 23 of the hairpin spring 24.

It will be recalled that operating the shutter release actuates the linkage 33 to lift the locking pawl 12 out of engagement with the ratchet 11, to make possible further film winding movement. This unlocking of the pawl 12 releases its arm 31 from engagement with the inner arm 32 of the double-armed locking lever 27. The lever end 32 automatically swings upwardly under the action of the spring end 25 on the lug 26. However there is no re-engagement of the lever arm 30 with the recess 29 since the arm 30 is no longer disposed opposite this recess. The film pressure plate 4 continues to press inwardly on the pin 20 to hold the lever arm 30 in the same position. The position of the lever arm 30 and the pin 20 are not altered until the camera back 3 is opened, usually after the last frame of the film has been exposed. Upon opening the camera back 3, the counteracting pressure of the film pressure plate against the pin 20 ceases, and the arm 23 of the spring 24 acts to rock the lever arm 21 in a clockwise direction, while the other lever arm 30 slides beneath the recess 29 and is again latched as shown in FIG. 1.

Figure 3:
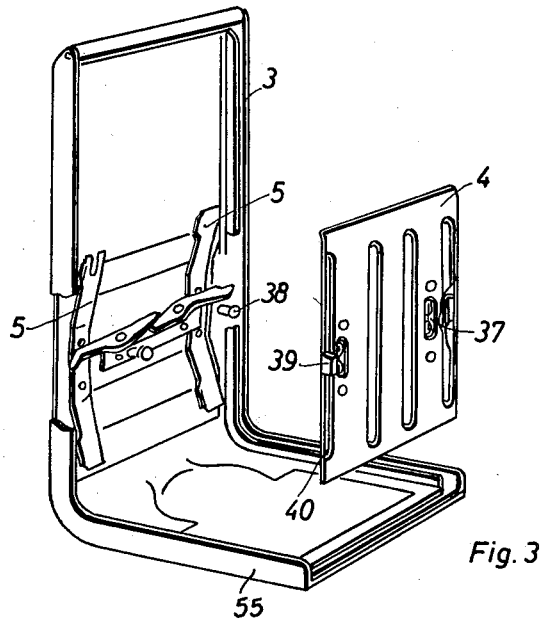
FIG. 3 is an exploded perspective view of the camera back and bottom walls and a pressure plate to be mounted on the back wall.
Figure 4:
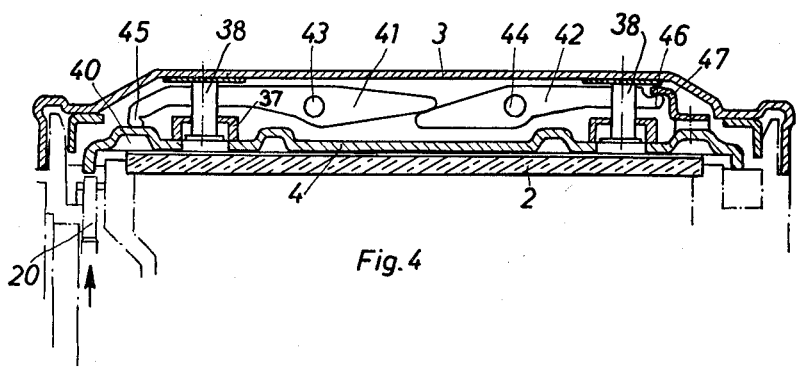
FIG. 4 is a horizontal cross sectional view through the assembled back wall and pressure plate shown in operative position with the glass plate, and taken approximately in the plane of the line 4—4 of FIG. 1.

In the preferred embodiment illustrated in FIGS. 1 and 2, the movement of the pressure plate 4 is limited by a single pin 20. In order to accomplish this without tilting the pressure plate 4, the construction of the plate 4 and camera back 3 as shown in FIGS. 3 and 4 is desirably used. The camera back 3 is preferably of the type which is L-shaped and integral with the bottom wall 55 of the camera. Two of the springs 5 are provided on the back wall 3, one at either side, and are preferably leaf springs with forwardly projecting ends. Preferably the pressure plate 4 is suspended on the springs 5 in such a way that it is displaceable in two or more stages longitudinally, as explained in the above mentioned U.S. Patent 2,645,170 and in German Patent 809,753. To this end, there are two forwardly projecting pins 38 which engage in longitudinal guide apertures 37 in the pressure plate 4. The guide apertures 37 are made oval and may be provided with detents, if desired. By this arrangement, a projection 39 on the pressure plate 4 is brought selectively into a position alined with any selected one of a plurality of notches of different heights or depths on the camera body, whereby film channels of different width or thickness can be adjusted.

The supporting pin 20 advantageously exerts its rearward pressure at or near one of a pair of longitudinally extending grooves 40 at either side of the pressure plate 4, which act as stiffening or strengthening ribs. Rotatable about two pins 43 and 44 on the camera back 3 are a pair of double-armed levers 41 and 42, the inner ends of which are disposed one upon the other in engagement. The outer end 45 of the lever 41 bears against the back of one groove 40 in the pressure plate 4, while the outer end 46 of the other lever 42 engages beneath a lug 47 extending rearwardly from the back of the pressure plate 4. If pressure is now exerted rearwardly on the pressure plate 4, in the vicinity of the groove 40 or at any other nearby position near the left hand edge of the plate 4 (viewed as in FIGS. 3 and 4) either by the pin 20 or by engagement with a fixed part of the camera housing, such pressure is transmitted through the levers 41 and 42 to the lug 47, and pulls this lug rearwardly, against the force of the spring 5 on that side of the pressure plate. Because of the identical transmission ratios of the two levers, the lug 47 at one side of the pressure plate will be pulled rearwardly by exactly the same amount that the other side of the pressure plate is displaced rearwardly by the force exerted upon it. Thus the pressure plates moves forwardly or rearwardly in parallel relation with the glass plate 2, without tilting.

This same arrangement of levers 41, 42, etc., to achieve parallel rearward movement of the pressure plate by force exerted on only one edge thereof, is especially useful in those cameras where it is desired to retract the pressure plate during each advance of the film from one frame or exposure position to the next, as for example, in Bretthauer application Serial No. 741,071, filed June 10, 1958 (now Patent 2,949,831, granted August 23, 1960).

In FIG. 4 it may be noted that with the pin 20 retracted, the side edges of the pressure plate 4 are urged by the springs 5 against the face of the image aperture frame 1. The shape of the pressure plate 4, however, is such that its central portion opposite the glass plate 2 is spaced from the glass plate 2 by a short distance to provide a film guide channel through which the film 6 may travel.

In the preferred embodiment described with regard to FIGS. 1 and 2, upon unlatching the lever arm 30 from the recess 29 of the locking lever 27, there is a complete release of the pressure plate 4, and the springs 5 urge the plate 4 forwardly until limited by engagement with the image aperture frame 1. It is also possible to provide an adjustable stop as illustrated in FIG. 2. In this case, for instance, a threaded sleeve 57 is secured in an aperture in the camera body, and an adjusting screw 34 having a knob 35 is screwed into the sleeve 53. The end 36 of the screw 34 is in the path of movement of the lever arm 30. By adjusting the screw 34, the lever arm 30 may be stopped at different positions upon being released from the recess 29 in the locking lever 27. Consequently, the pin 20 is retracted by variable amounts, and the width or thickness of the film guide channel between the pressure plate 4 and the film plate 2 is adjusted correspondingly. The width of the guide film channel may be varied either intermittently or otherwise to the desired width.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a camera body having an image aperture frame in which is mounted a glass plate, said camera including a back wall having a resiliently suspended film pressure plate, said pressure plate bearing against said image aperture frame while providing a film guide channel between the central portions thereof and said glass plate, a supporting pin slidably mounted in said camera body, means for moving said supporting pin between an operative position and an inoperative retracted position, said supporting pin in said operative position engaging said film pressure plate to hold said pressure plate at an increased distance from said glass plate to provide an enlarged film guide channel through which a thickened portion of film at an adhesive attachment point may pass without binding, film winding and counting means and a film wind locking pawl for latching said winding and counting means, and latching means for holding said supporting pin in said operative position, said latching means being released by said film wind locking pawl during its movement into locking position, said latching means including a double-armed lever and a locking lever having a recess, spring means for acting on one arm of said double-armed lever to urge said supporting pin toward its operative position under a tension less than the tension of other springs resiliently suspending said pressure plate on said camera back, the other arm of said double-armed lever being engaged in said locking lever recess under the action of another arm of said spring means, and film winding and counting means and a film wind locking pawl for latching said winding and counting means, said locking lever lying in the path of movement of said pawl to be released thereby.

2. A photographic camera comprising a camera body having an image aperture frame in which is mounted a glass plate, said camera including a back wall having a resiliently suspended pressure plate, said pressure plate bearing against said image aperture frame while providing a film guide channel between the central portions thereof and said glass plate, a supporting pin slidably mounted in said camera body, means for moving said supporting pin between an operative position and an inoperative retracted position, said supporting pin in said operative position engaging said film pressure plate to hold said pressure plate at an increased distance from said glass plate to provide an enlarged film channel through which the thickened connection portion of film may pass without binding, means for moving said supporting pin to an intermediate position for providing a channel width which is between the said enlarged film channel width and the width resulting when the supporting pin is in the retracted inoperative position, film winding and counting means and a film wind locking pawl for latching said winding and counting means, a spring biased double-armed lever and locking lever for latching said supporting pin in said operative position, said locking lever lying in the path of motion of said pawl to be released thereby, and a manually adjustable stop mounted on said camera body to be engaged by said double-armed lever upon being released by said locking lever, to hold said supporting pin in its intermediate position.

3. A photographic camera comprising a camera body having a main portion and a back wall mounted for movement away from the main portion to open the camera body for loading the body with film and for movement toward the main portion to close the camera body ready for exposure of the film, an image aperture frame stationarily mounted in said main portion, a pressure plate mounted on and movable bodily with said back wall and also mounted for limited forward and backward movement relative to said back wall in a direction toward and away from said aperture frame when the back wall is in closed position, said aperture frame and pressure plate forming between them a film channel of variable thickness, first spring means operatively interposed between said back wall and said pressure plate and tending to move said pressure plate forwardly toward said aperture frame while said back wall is in closed position, to decrease the thickness of said film channel, a pressure-plate-engaging support member mounted in said main portion of said camera body for movement between a first position engaging said pressure plate to hold said pressure plate far enough from said aperture frame to form a relatively thick film channel between them, and a second position allowing said first spring means to move said pressure plate closer to said aperture frame to form a thinner film channel between them, second spring means tending to move said support member toward its said first position, said first spring means having greater power than said second spring means so that said first spring means may displace said support member from its first position toward its second position notwithstanding said second spring means and may move said pressure plate closer to said aperture frame to form a thinner film channel, unless said support member is restrained from such displacement otherwise than merely by said second spring means, film winding means including an element movable from a first position to a second position at the conclusion of an initial film winding operation, a releasable latch for restraining displacement of said support member from its first position toward its second position, and means operated by movement of said element from its first position to its second position for releasing said latch so that said first spring means may thereupon overcome the force of said second spring means and may move said pressure plate forwardly to decrease the thickness of said film channel and move said support member to its second position, the parts being so proportioned that when said camera body is opened for loading a fresh film, the pressure plate will separate from said support member so that said second spring means will move said support member back to its first position and said latch will hold said support member in its first position until said element releases said latch.

References Cited in the file of this patent

UNITED STATES PATENTS

| | | |
|---|---|---|
| 2,228,880 | Landrock | Jan. 14, 1941 |
| 2,704,959 | Myers | Mar. 29, 1955 |
| 2,753,777 | Faulhaber et al. | July 10, 1956 |
| 2,949,831 | Bretthauer | Aug. 23, 1960 |

FOREIGN PATENTS

| | | |
|---|---|---|
| 720,603 | Germany | July 16, 1942 |